(12) United States Patent
Mann

(10) Patent No.: US 10,058,104 B2
(45) Date of Patent: Aug. 28, 2018

(54) FOOD COOKER AND SMOKER

(71) Applicant: Michael Leroy Mann, Houston, TX (US)

(72) Inventor: Michael Leroy Mann, Houston, TX (US)

( * ) Notice: Subject to any disclaimer, the term of this patent is extended or adjusted under 35 U.S.C. 154(b) by 370 days.

(21) Appl. No.: 14/737,364

(22) Filed: Jun. 11, 2015

(65) Prior Publication Data

US 2016/0360762 A1    Dec. 15, 2016

(51) Int. Cl.
*A23B 4/052*     (2006.01)

(52) U.S. Cl.
CPC .................................. *A23B 4/052* (2013.01)

(58) Field of Classification Search
CPC ...................................................... A23B 4/052
USPC ................................... 99/482, 481, 467, 474
See application file for complete search history.

(56) References Cited

U.S. PATENT DOCUMENTS

| | | | | |
|---|---|---|---|---|
| 5,913,967 A * | 6/1999 | Eisele | ................... | A23B 4/0526 99/468 |
| 5,967,027 A * | 10/1999 | Higashimoto | ......... | A23B 4/044 126/21 A |
| 7,984,672 B1 * | 7/2011 | Yun | ........................ | A23B 4/044 99/468 |
| 2009/0136638 A1 * | 5/2009 | Fujie | ..................... | A23B 4/044 426/314 |
| 2013/0239823 A1 * | 9/2013 | Re | ......................... | A23B 4/044 99/474 |
| 2013/0255116 A1 * | 10/2013 | Kaoh | .................... | G09F 27/005 40/563 |

* cited by examiner

*Primary Examiner* — David Angwin
*Assistant Examiner* — Biniam Asmelash
(74) *Attorney, Agent, or Firm* — Plager Schack LLP; Mark H. Plager

(57) ABSTRACT

Some embodiments of the present disclosure include a device for smoking and cooking food. The device may include a food enclosure and a smoke distribution manifold operatively connected to the food enclosure, the smoke distribution manifold configured to operatively connect to a smoke providing device, such as a customized smoker box or a conventional smoking device. The quality of the smoke is determined by a value from a sensor, such as a lux sensor, and the smoke distribution manifold may prevent bad quality smoke from contaminating the food in the food enclosure.

8 Claims, 6 Drawing Sheets

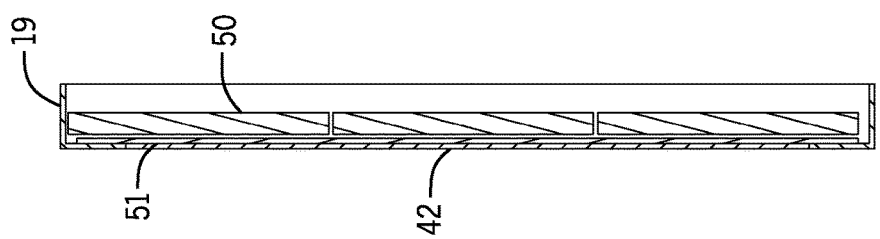
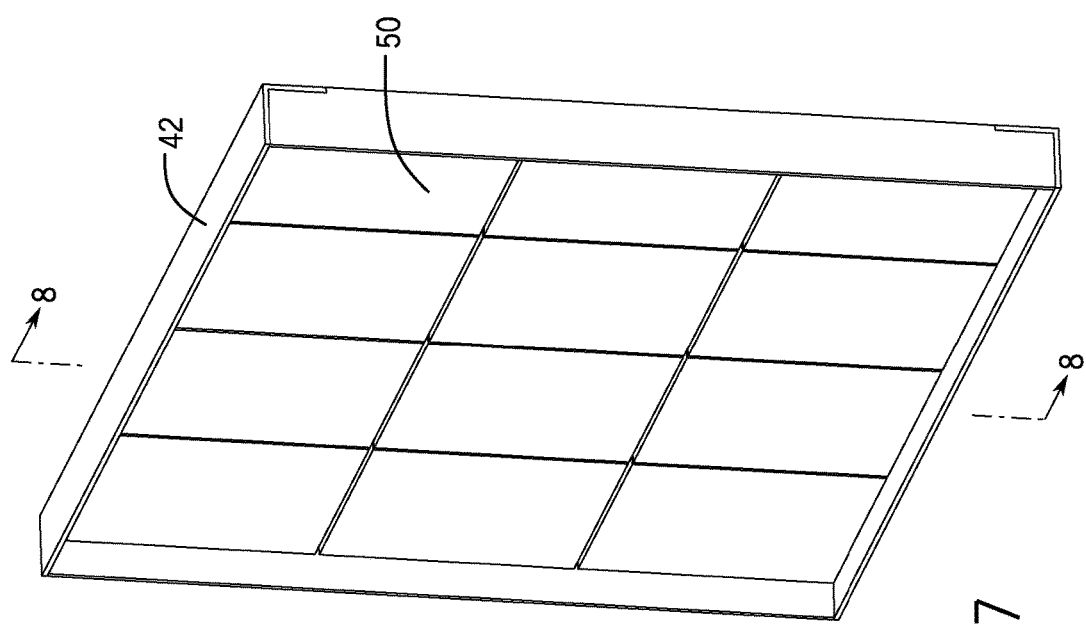

FOOD COOKER AND SMOKER

BACKGROUND

The embodiments herein relate generally to food preparation, and more particularly, to a food cooker and smoker.

Conventional food smokers suffer from temperature inconsistencies, non-portability, food contamination due to bade smoke, and non-scalability. Specifically, excellent heat retention devices are typically very heavy and not easily portable, often requiring multiple people to carry the device or haul it with a truck. Portable devices do not offer good heat retention. Existing devices also do not prevent exposure to combined bad quality smoke and temperature. The existing devices are also not scalable, meaning that a user is unable to expand the capacity with an incremental cost investment.

Therefore, what is needed is a food cooker that is separate and attachable to a smoke providing device, such as a collapsible smoker, via a smoke distribution manifold such that multiple food cookers may be attached to the same smoker. The device may have improved portability, may be scalable, and may prevent food being exposed to poor quality smoke.

SUMMARY

Some embodiments of the present disclosure include a device for smoking and cooking food, the device including a food enclosure and a smoke distribution manifold operatively connected to the food enclosure, the smoke distribution manifold configured to filter smoke to the food enclosure or atmosphere depending on the quality of the smoke, which may be determined by a value from a sensor, such as a lux sensor, and the smoke distribution manifold may prevent bad quality smoke from contaminating the food in the food enclosure. Some embodiments also include a collapsible and detachable smoker box configured to be attached to the device.

BRIEF DESCRIPTION OF THE FIGURES

The detailed description of some embodiments of the invention is made below with reference to the accompanying figures, wherein like numerals represent corresponding parts of the figures.

FIG. 7 is a perspective view of one embodiment of the present disclosure.

FIG. 8 is a cross-sectional view of one embodiment of the present disclosure, taken along line 8-8 in FIG. 7.

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used to cook and smoke food and may comprise the following elements: (1) food enclosure; (2) smoke distribution manifold; and (3) optional collapsible and detachable smoke providing device. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the food cooker and smoker of the present disclosure may be related in the following exemplary fashion. It is not intended to limit the scope or nature of the relationships between the various elements and the following examples are presented as illustrative examples only.

Figure 3:
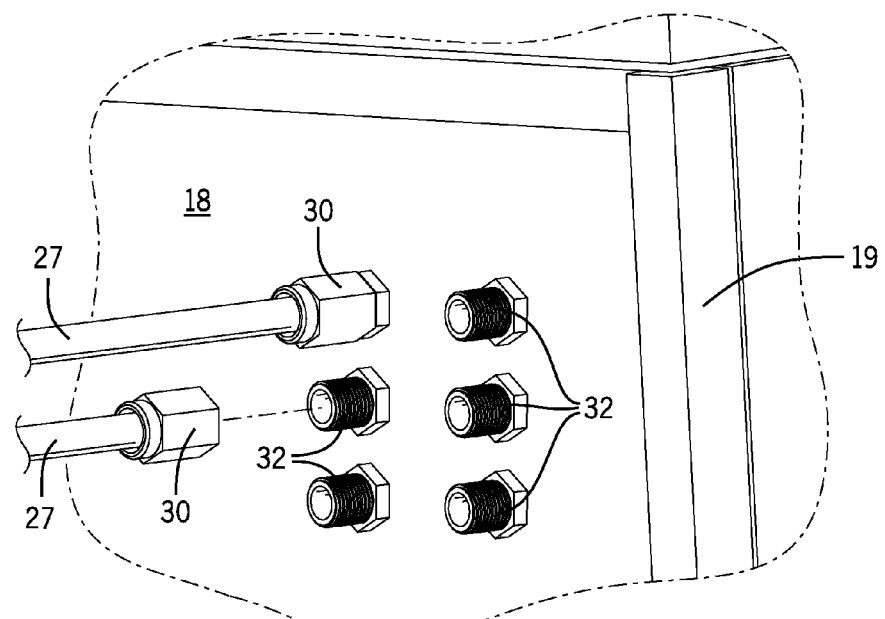
FIG. 3 is a perspective view of one embodiment of the present disclosure, taken along line 3-3 in FIG. 1.
Figure 4:
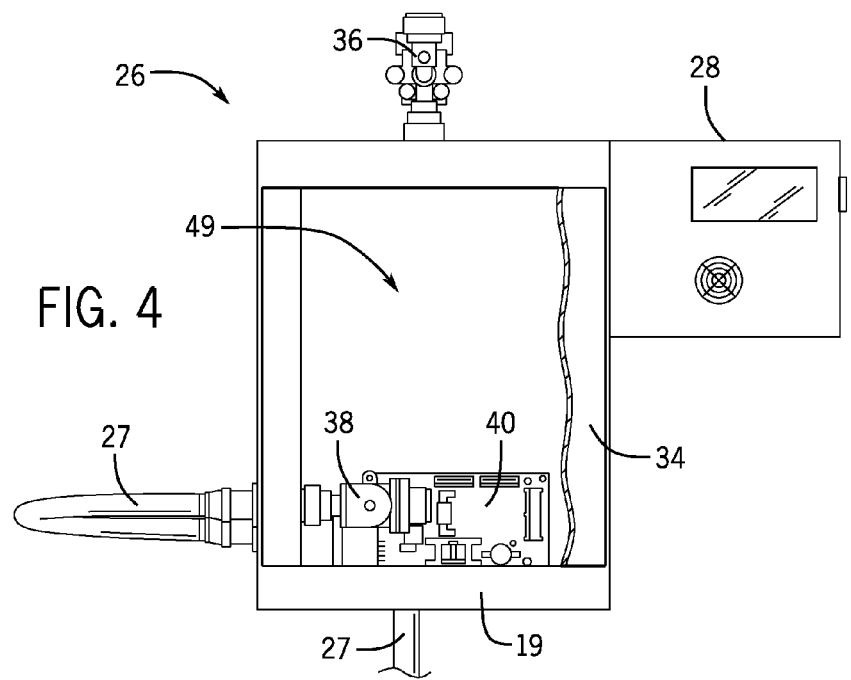
FIG. 4 is an elevational view of one embodiment of the present disclosure.

By way of example, and referring to FIGS. 1-8, some embodiments of the food smoker of the present disclosure comprise a food enclosure 22 configured to accommodate food, the food enclosure 22 operatively connected to a smoke distribution manifold 26 which is operatively connected to a smoke providing device, wherein the smoke distribution manifold 26 prevents bad quality smoke from contaminating the food in the food enclosure 22 and wherein properties of good quality versus bad quality smoke are preset by a user. A smoke supply line 27 may attach the smoke distribution manifold 26 to the food enclosure 22, wherein only high quality smoke is allowed to travel from the manifold 26 to the food enclosure 22. A smoke supply line may also attach the manifold 26 to the smoke providing device, wherein when the smoke is of high quality, the manifold 26 allows it to pass through to the food enclosure 22; however, when the smoke is determined to be of less than desired quality, the manifold 26 provides for release of the poor quality smoke to the surrounding environment. Specifically, as shown in FIG. 4, the manifold 26 may comprise a control box 48 with an incoming smoke supply line 22 leading into an interior of the control box 48. A microcontroller 40 located within the control box 48 may include a lux sensor or the like to determine whether the smoke is of high enough quality to be provided to the food enclosure 22. If the smoke is of high enough quality and a particular lux value has been met, a voltage signal may be sent to the microcontroller 40 causing a smoke solenoid supply valve 38 to be opened, allowing the smoke to flow out of the control box 48 through a smoke supply line 27 to the food enclosure 22. If the smoke is not of sufficient quality as determined by a lux value, a voltage signal may be sent to the microcontroller 40 causing the smoke solenoid supply valve 38 to be closed and a smoke solenoid vent valve 36 to be opened to release the poor quality smoke to the environment.

The quality of the smoke may be determined by, for example, combined lux and heat measurements. For example, if an LED light that registers an average value of 1000 lux with a light meter placed about 8 inches away from the LED light that is placed inside of the smoke distribution manifold 26, good quality smoke may be defined as smoke that does not lower the measured LED light value by more than about 800 lux. Also, for good quality smoke, a smoke temperature measured with a temperature probe approximately 4 inches away from a heat source may not fall below about 250° F. In this example, if the fire begins to smolder and the temperature of the heat source falls, then bad quality smoke will be produced, as indicated by a thick white color. Bad quality smoke will result in measured values of the smoke with the temperature probe and light meter in the above described configuration including a temperature less than about 250° F. and a lux value less than about 200. Thus, in this example, the solenoid valve 36 to the food enclosure 22 would remain closed if the measured illuminance value of the light is less than about 200 lux and/or the smoke temperature is less than about 250° F. Of course, these values may vary depending on the exact set up of the measuring devices and distances away from the specimens being measured. Smoke temperature and illuminance are just two parameters that can characterize the quality of smoke, and other similar measured values could be used, such as luminance, luminance intensity, luminance flux, smoke particle size, smoke density, color, and the like. In any instance, a display 28, such as an LCD display, attached to the exterior of the manifold 26 may be used to display smoke and heat control variables. The manifold 26 may also comprise a manifold door 34 to allow a user to access the interior of the manifold 26, if needed. The parameters used to cook the food, such as meat, as a function of time may be recorded and available to the user to better understand the cooking process used to cook the food. For example, a chart with time on the x-axis and temperature and smoke lux values on the y-axis may be provided each time the system was used or as desired.

Figure 1:
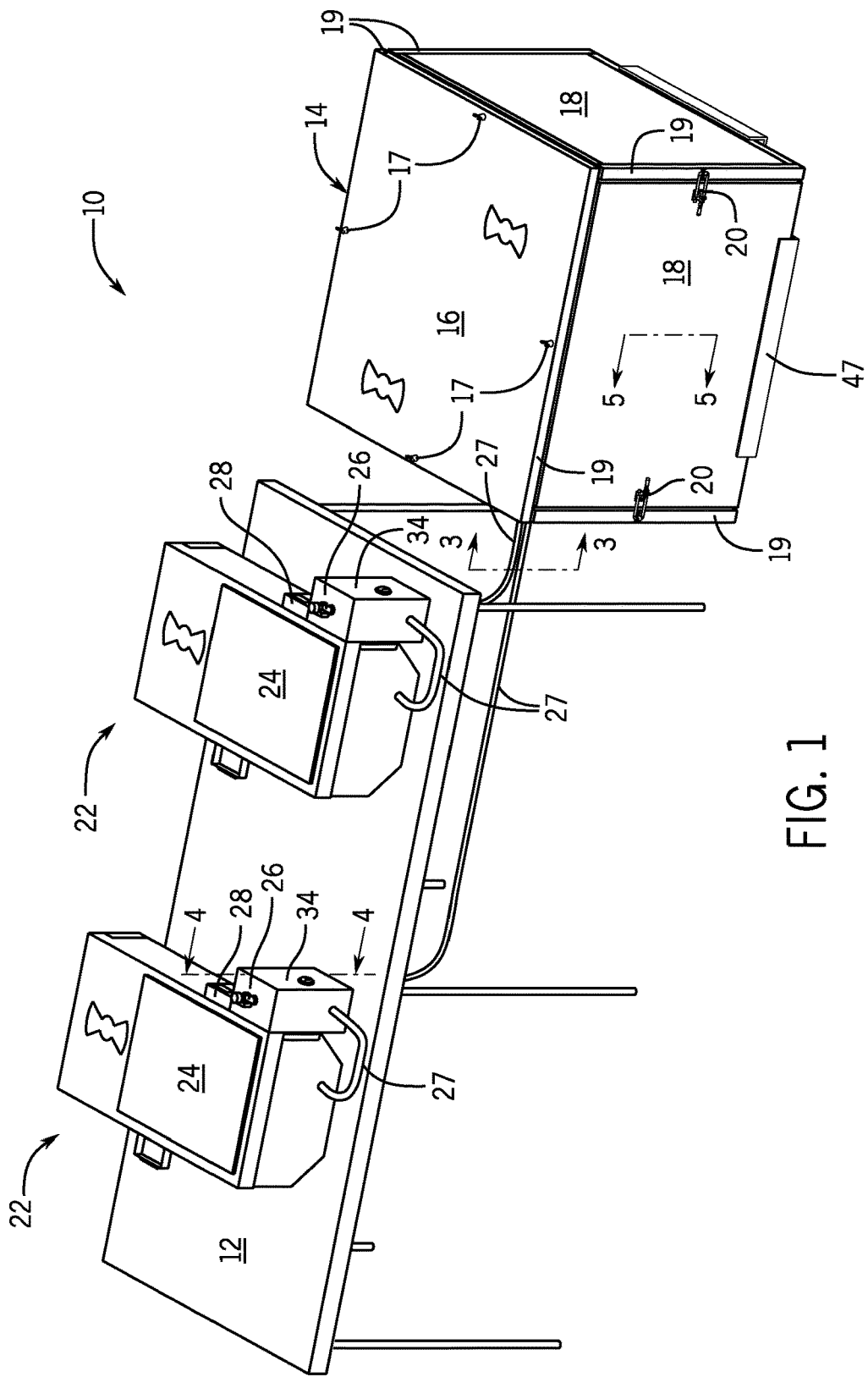
FIG. 1 is a front perspective view of one embodiment of the present disclosure.
Figure 2:
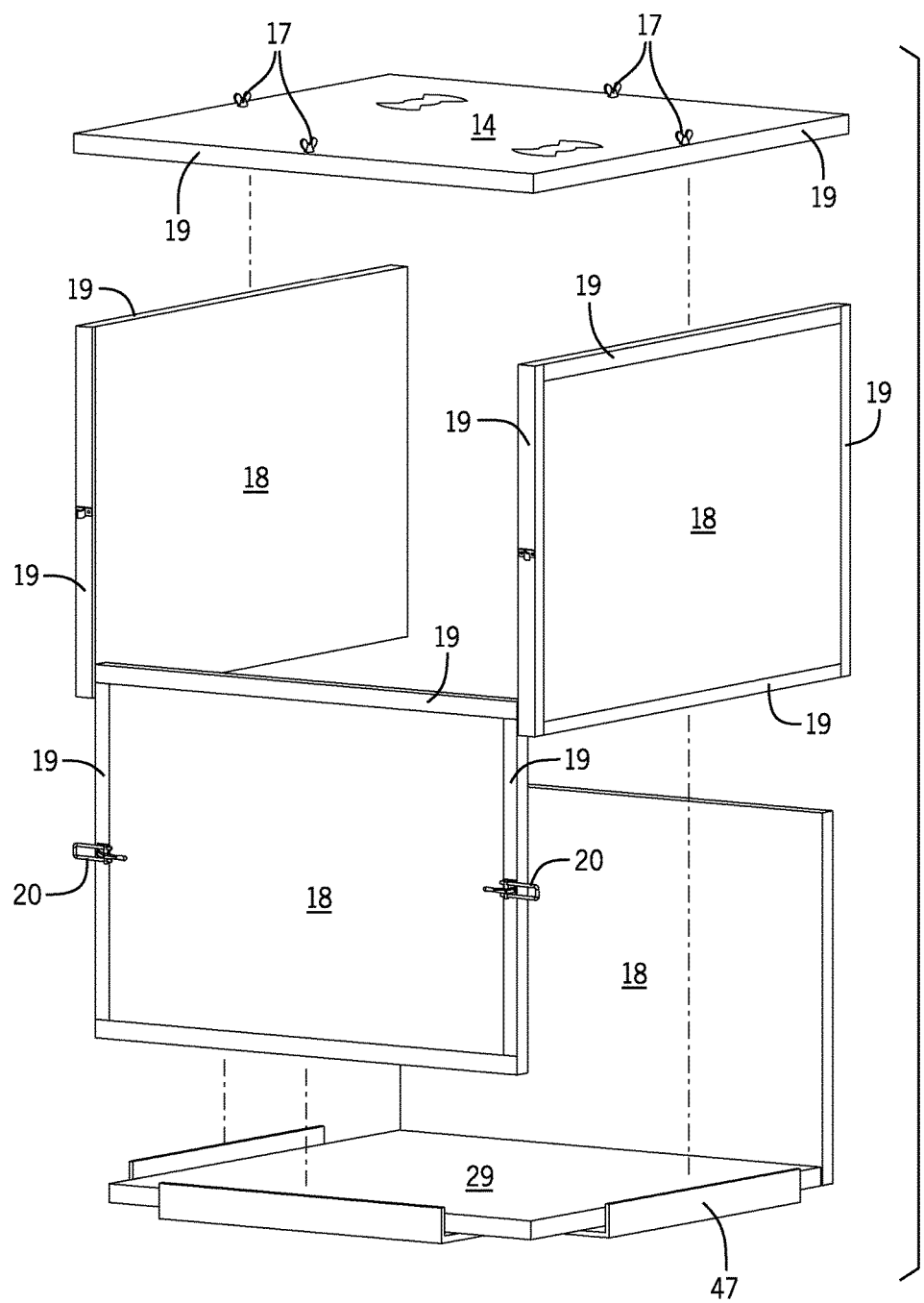
FIG. 2 is an exploded perspective view of one embodiment of the present disclosure.

The food enclosure box 22 may have a size suitable for accommodating food, wherein an openable lid 24 provides a user with a way to insert food into and take food out of the food enclosure 22. The lid 24 may have an airtight seal, such that only smoke flowing from the manifold 26 is permitted to enter the food enclosure box 22. When desired, the food enclosure 22 may be placed on a base, such as a table 12, as shown in FIG. 1. The food enclosures 22 may maintain an ideal and independent temperature stabilization with an electric heater.

As shown in FIG. 1, the smoke providing device may be a smoker box 14. The smoker box 14 may comprise a lightweight side panels 18, a lid 16, and a bottom panel 29, all with integrated frames 19, wherein the bottom panel 29 may have an alignment system 47 extending therefrom, the alignment system 47 configured to engage with the side panels 18 such that the smoker box 14, when assembled, has airtight seals. The side panels 18 may engage with one another using any suitable fastener and, in some embodiments, attach to one another using a latch system 20 and, thus, the side panels 18 may be self-sealing. Similarly, the lid 14 may connect to the side panels 18 using any suitable fastener and, in some embodiments, attaches to the side panel 18 using a plurality of lid locks 17. For transportability, all panels may be stackable and detachable from the smoke distribution manifold 26 and food enclosures 22. A smoke generating device, such as woodchips heated or burned at a suitable temperature, may be positioned within the smoker box 14. At least one of the side panels 18 may comprise at least one fittings, such as male fittings 32, onto which a smoke supply line 27 may be attached using, for example, a female fitting 30, as shown in FIG. 3. Because the smoker box 14 may supply smoke to multiple food enclosures 22, and thus multiple manifolds 26, the side panel 18 may comprise a plurality of fittings 32 configured to attach to smoke supply lines 27 to multiple manifolds 26.

Figure 5:
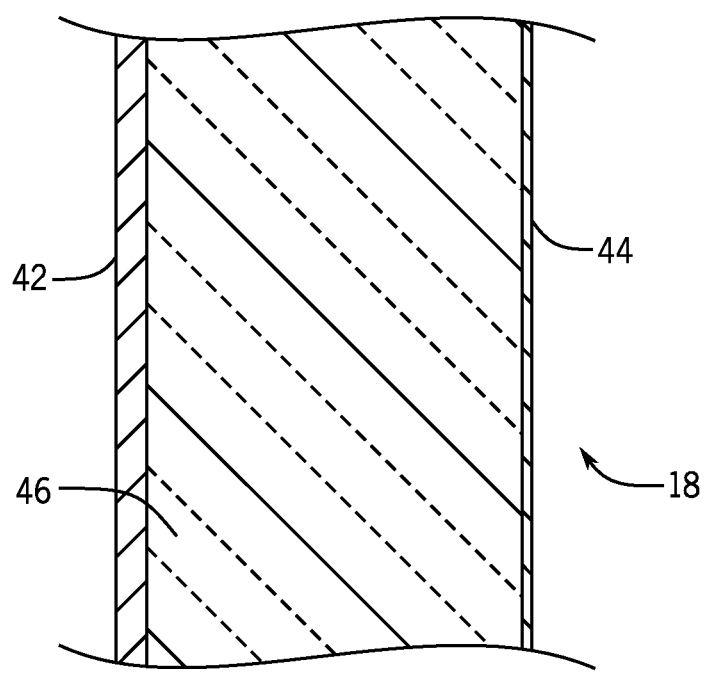
FIG. 5 is a cross-sectional view of one embodiment of the present disclosure, taken along line 5-5 in FIG. 1.
Figure 6:
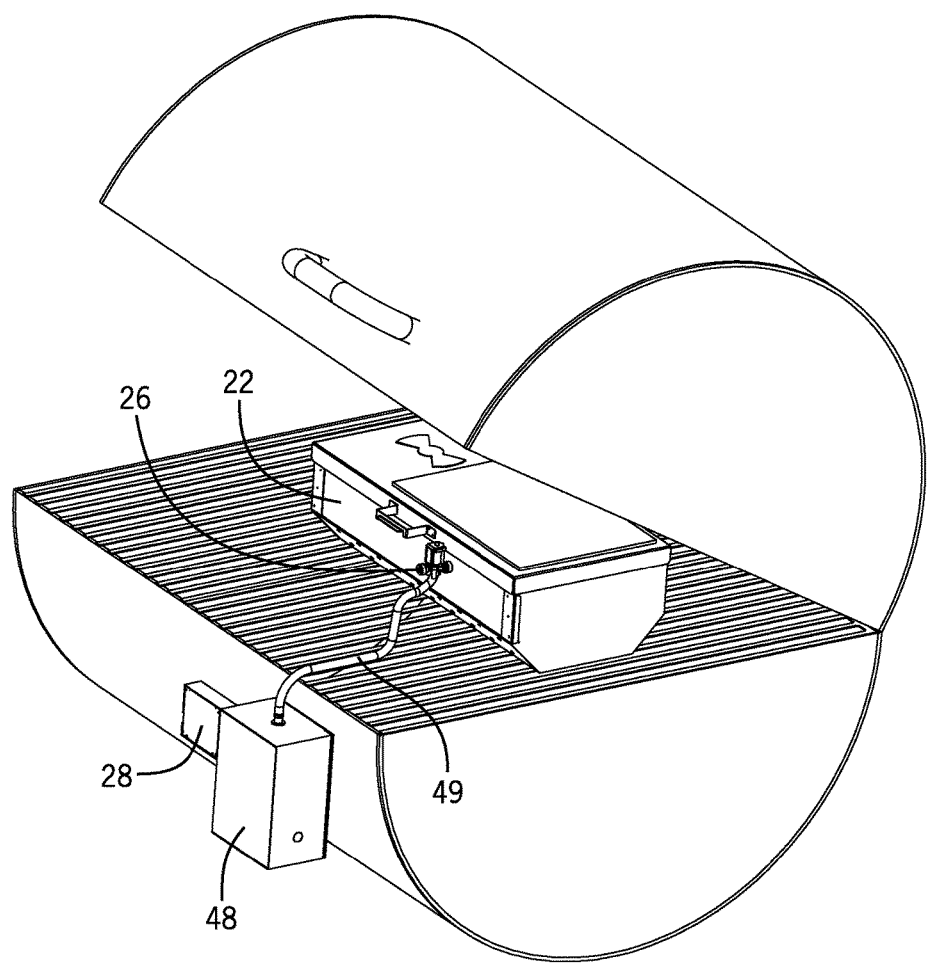
FIG. 6 is a perspective view of one embodiment of the present disclosure.

The smoker box 14 may be made of a plurality of panels 18, as described above. Each panel 18 may comprise a modular, stackable, lightweight panel made of a laminate material for superior strength, light, and heat retention. As shown in FIG. 5, each panel 18 may comprise an insulation layer 46 sandwiched between an outer sheet metal plate 42 and an inner sheet metal plate 44. Alternatively, as shown in FIGS. 7 and 8, the panel may comprise a frame 19 attached to an outer sheet metal 42, wherein a plurality of ceramic tiles 50 are adhered to the outer sheet metal 42 using a bonding agent 51 to create the panel 18. In yet a further alternative, the smoker box 14 may be of a permanent shape rather than a panel construction.

The food enclosure 22 may be used with conventional smoking devices, such as commercially available smokers or grills, wherein the food enclosure 22 may have a smoke distribution manifold 26 attached to an outer surface thereof, the smoke distribution manifold 26 being configured to filter smoke into the food enclosure 22 or to the atmosphere, as described above. The smoke distribution manifold 26 may be operatively attached to an external control box 48 with a display 28 by, for example, a control cable 49 or by wireless communication using, for example, acoustic or radio frequency.

The cooker and smoker of the present disclosure may be portable and modular via standardized and light weight panels 18, which may be disassembled and put into a travel case. A user may have complete control of variables, including smoke quality exposed to the food and temperature, using the display 28 and control box 48, and may record those values as a function of time. The system may be highly scalable, meaning that a user may add multiple food enclosures 22. The system may also provide for the burning of a very hot fire for ideal smoke creation without burning the food. The system may also guarantee that the food is only exposed to high quality smoke. The determination of what qualifies as high quality smoke may be set by a user, but in general, a thinner, hotter smoke is typically a more desirable smoke. Sooty, bad quality smoke produced from a low temperature heat source may be differentiated from high quality smoke using lux values of the smoke.

The system of the present disclosure may further comprise a filter, wherein the filter is configured to filter the bad quality smoke into good quality smoke such that all smoke may be used to smoke the food in the food enclosure 22.

To use the system of the present disclosure, a user would assemble the system as required. To smoke food, a fire would be built inside the smoker box 14 and the controller 48 would be turned on. A temperature set point would be set, and the option to smoke would be selected on the controller 48. Meat or other food items to be smoked would be placed inside of the food enclosure 22 and a propane burner or heating element proximate to the food enclosure 22 would be activated. Once high quality smoke is produced, the microcontroller 40 would open the smoke solenoid supply valve 38, allowing smoke to flow to the food enclosure 22, wherein the good would begin to cook and process via the smoke in the food enclosure 22 and the heating element. A user may manage the fire, as necessary, by adding wood and would not have to worry about bad quality smoke entering the food enclosure 22 during the low temperature kindling or smoldering stages of the fire burning process. The food would then cook over time, wherein temperature and smoke may be controlled. When the cooking is complete, the system may be detached, disassembled, and stored.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A device for smoking and cooking food, the device comprising:
   a food enclosure configured to accommodate food; and
   a smoke distribution manifold operatively connected to the food enclosure, the smoke distribution manifold configured to operatively connect to a smoke providing device, the smoke distribution manifold comprising:
      an inlet smoke supply line configured to transport smoke from the smoke providing device to the smoke distribution manifold;
      a light emitting diode light source positioned within the smoke distribution manifold, the light emitting diode light source registering an average value of 1000 lux;
      a lux sensor positioned within the smoke distribution manifold proximate to the light emitting diode light source;
      a microcontroller operatively connected to the lux sensor;
      a smoke solenoid supply valve operatively connected to the microcontroller and to a smoke supply line configured to transport smoke from the smoke distribution manifold to the food enclosure; and
      a smoke solenoid vent valve operatively connected to the microcontroller,
   wherein:
      quality of the smoke is determined by a value from the lux sensor;
      good quality smoke results in the lux sensor sensing a lux value of at least about 200 lux; and
      bad quality smoke results in the lux sensor sensing a lux value of lower than about 200 lux;
      the smoke distribution manifold prevents bad quality smoke from contaminating the food in the food enclosure;
      when the lux sensor determines that the smoke is the bad quality smoke, the microcontroller closes the smoke solenoid supply valve and opens the smoke solenoid vent valve, releasing the bad quality smoke to the environment; and
      when the lux sensor determines that the smoke is the good quality smoke, the microcontroller closes the smoke solenoid vent valve and opens the smoke solenoid supply valve, allowing the good quality smoke to be transported to the food enclosure.

2. The device of claim 1, wherein:
   the lux sensor is positioned about 8 inches away from the light emitting diode light source.

3. The device of claim 1, further comprising a heating element configured to heat the food enclosure, such that the temperature of the food enclosure is controlled by a user.

4. The device of claim 1, wherein the smoke providing device is a member selected from the group consisting of a customized smoker box or a conventional smoking device.

5. A system for smoking and cooking food, the system comprising:
   a food enclosure configured to accommodate food;
   a smoke distribution manifold operatively connected to the food enclosure, the smoke distribution manifold comprising:
      an inlet smoke supply line configured to transport smoke from the smoke providing device to the smoke distribution manifold;
      a light emitting diode light source positioned within the smoke distribution manifold, the light emitting diode light source registering an average value of 1000 lux;
      a lux sensor positioned within the smoke distribution manifold proximate to the light emitting diode light source;
      a microcontroller operatively connected to the lux sensor;
      a smoke solenoid supply valve operatively connected to the microcontroller and to a smoke supply line configured to transport smoke from the smoke distribution manifold to the food enclosure; and
      a smoke solenoid vent valve operatively connected to the microcontroller; and
   a portable smoker box operatively connected to the smoke distribution manifold, the smoker box configured to contain a fire and release smoke to the smoke distribution manifold, the smoker box having a paneled construction,
   wherein:
      quality of the smoke is determined by a value from the lux sensor;
      good quality smoke results in the lux sensor sensing a lux value of at least about 200 lux,
      bad quality smoke results in the lux sensor sensing a lux value of lower than about 200 lux;
      the smoke distribution manifold prevents bad quality smoke from contaminating the food in the food enclosure;
      when the lux sensor determines that the smoke is the bad quality smoke, the microcontroller closes the smoke solenoid supply valve and opens the smoke solenoid vent valve, releasing the bad quality smoke to the environment; and
      when the lux sensor determines that the smoke is the good quality smoke, the microcontroller closes the smoke solenoid vent valve and opens the smoke solenoid supply valve, allowing the good quality smoke to be transported to the food enclosure.

6. The system of claim 5, wherein:
   the lux sensor is positioned about 8 inches away from the light emitting diode light source.

7. The system of claim 5, wherein the smoker box comprises a plurality of side panels, a lid, and a bottom panel, each having an integrated frame wherein:
   the bottom panel has an alignment system extending therefrom, the alignment system configured to engage with the side panels such that the smoker box, when assembled, has airtight seals;
   the side panels engage with one another using an interlocking latch system, resulting in the side panels being self-sealing; and
   the lid connects to the side panels using a plurality of lid locks.

8. The system of claim 7, wherein each of the panels comprises an insulation layer sandwiched between an outer sheet metal plate and an inner sheet metal plate.

* * * * *